US010093046B2

(12) United States Patent
Enneking et al.

(10) Patent No.: US 10,093,046 B2
(45) Date of Patent: Oct. 9, 2018

(54) INJECTION-MOLDING TOOL AND METHOD FOR PRODUCING AN INJECTION-MOLDED PART

(71) Applicant: PlasmaTreat GmbH, Steinhagen (DE)

(72) Inventors: Leonhard Enneking, Damme (DE); Artur Grishin, Steinhagen (DE); Christian Buske, Bielefeld (DE); Alexander Knospe, Bad Muender (DE); Timo Nordmeyer, Bielefeld (DE); Elmar Moritzer, Bad Lippspringe (DE); Martin Andreas Schmidt, Bielefeld (DE); Christian Leister, Hof (DE)

(73) Assignee: PlasmaTreat GmbH, Steinhagen (DE)

( * ) Notice: Subject to any disclaimer, the term of this patent is extended or adjusted under 35 U.S.C. 154(b) by 0 days.

(21) Appl. No.: 15/563,296

(22) PCT Filed: Mar. 31, 2016

(86) PCT No.: PCT/EP2016/057040
§ 371 (c)(1),
(2) Date: Sep. 29, 2017

(87) PCT Pub. No.: WO2016/156479
PCT Pub. Date: Oct. 6, 2016

(65) Prior Publication Data
US 2018/0071965 A1 Mar. 15, 2018

(30) Foreign Application Priority Data
Mar. 31, 2015 (DE) .................. 10 2015 104 991

(51) Int. Cl.
*B29C 45/00* (2006.01)
*B29C 59/14* (2006.01)

(52) U.S. Cl.
CPC .......... *B29C 45/0053* (2013.01); *B29C 59/14* (2013.01); *B29C 2045/0079* (2013.01); *B29C 2059/145* (2013.01)

(58) Field of Classification Search
CPC ...... B29C 2045/0079; B29C 2059/145; B29C 45/0053; B29C 59/14
See application file for complete search history.

(56) References Cited

U.S. PATENT DOCUMENTS 5,236,636 A     8/1993   Tisack
5,560,963 A * 10/1996   Tisack ................ B29C 45/0053
                                                                    264/446

(Continued)

FOREIGN PATENT DOCUMENTS

DE    102004061268 A1    6/2006
DE    102012101116 A1    8/2012

(Continued)

OTHER PUBLICATIONS

Schutze et al. "The Atmospheric-Pressure Plasma Jet: A Review and Comparison to Other Plasma Sources", IEEE Transactions of Plasma Science, vol. 26, No. 6, Dec. 1998 pp. 1685-1694. (Year: 1998).*

*Primary Examiner* — Jill L Heitbrink
(74) *Attorney, Agent, or Firm* — The Webb Law Firm

(57) ABSTRACT

The invention relates to an injection molding tool for producing an injection molded part, in particular made of plastic, having an injection mold which has a cavity corresponding to the negative of the shape of the injection molded part to be produced, wherein a plasma nozzle, which is configured to produce an atmospheric plasma jet, is attached to the injection mold in such a way that an injection molded part produced in the injection mold can be impacted in the injection mold with a plasma jet.

11 Claims, 4 Drawing Sheets

(56) References Cited

Figure 1:
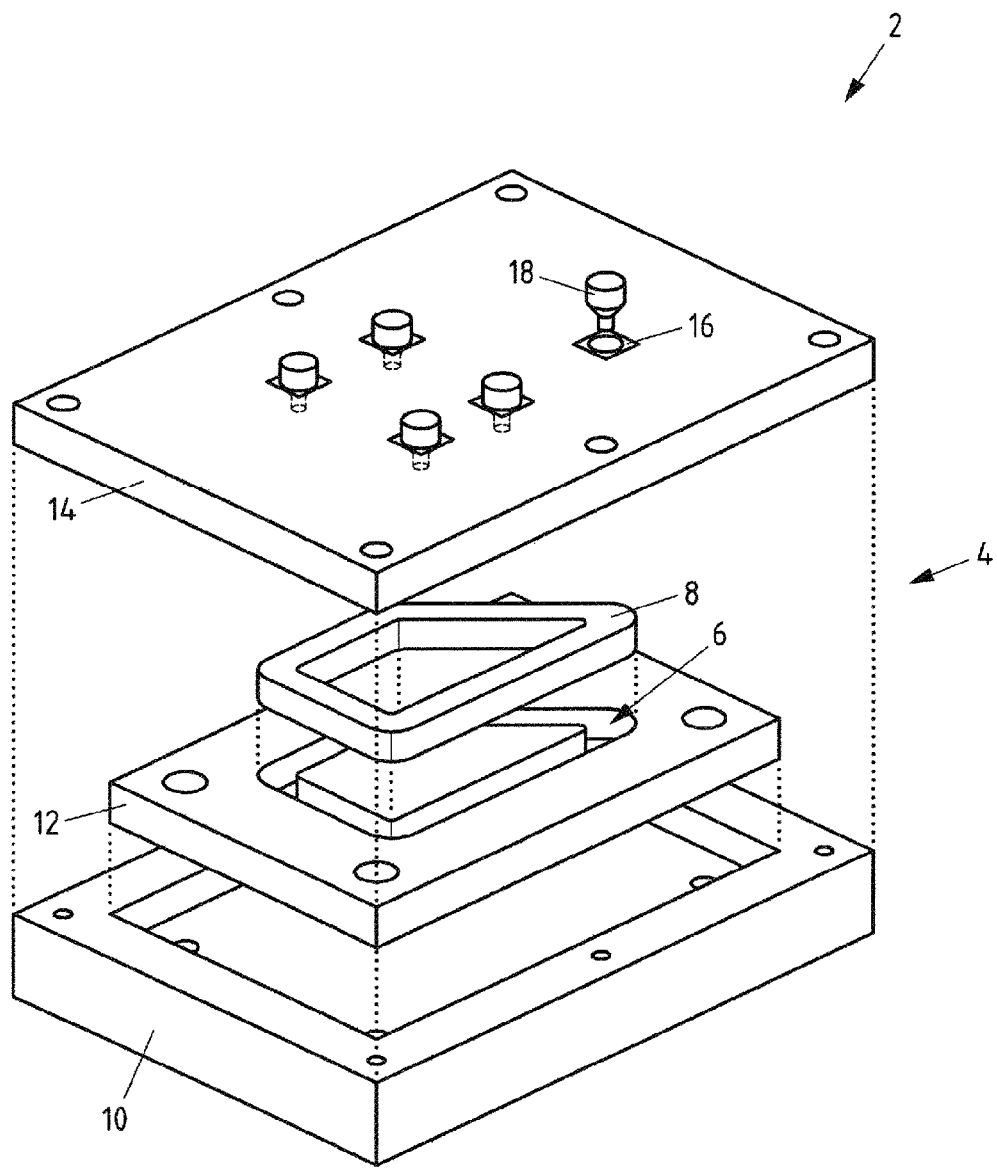

U.S. PATENT DOCUMENTS 7,744,790 B2   6/2010  Behle et al.
2009/0174120 A1   7/2009  Sugai

FOREIGN PATENT DOCUMENTS

| EP | 0541230 A2 | 5/1993 |
| JP | 63256426 A | 10/1988 |
| WO | 03013738 A2 | 2/2003 |

* cited by examiner

INJECTION-MOLDING TOOL AND METHOD FOR PRODUCING AN INJECTION-MOLDED PART

CROSS-REFERENCE TO RELATED APPLICATIONS

This application is the United States national phase of International Application No. PCT/EP2016/057040 filed Mar. 31, 2016, and claims priority to German Patent Application No. 10 2015 104 991.0 filed Mar. 31, 2015, the disclosures of which are hereby incorporated in their entirety by reference.

BACKGROUND OF THE INVENTION

Field of the Invention

The invention relates to an injection moulding tool for producing an injection moulded part, in particular consisting of plastic, having an injection mould which has a cavity corresponding to the negative of the shape of the injection moulded part to be produced. The invention further relates to a method for producing an injection moulded part using an injection moulding tool.

Description of Related Art

Plastics are often chemically unreactive and difficult to wet since their long polymer chains have a low surface tension and possess no or only a few functional groups. Therefore, they bond badly and often have insufficient adhesion properties and have to be activated on the surface by means of a pretreatment.

From the prior art, it is known to pretreat plastics with plasma, in order to activate their surfaces. In the case of plasma treatment, the ions and free electrons in the plasma jet introduce nitrogen and oxygen into the polymer surface. The wetting and adhesive properties of the plastics can be improved by means of the plasma treatment, so that materials and substrates can be pretreated efficiently and according to individually definable surface properties.

Many plastic components are produced by injection moulding. Various methods are possible for the pretreatment of such injection moulded parts.

On the one hand, it is possible to treat the surface of the injection moulded parts "inline" in the injection moulding tool or in a downstream process step. In particular, the inline treatment in the injection moulding tool can be carried out by means of a robot. With this method, a plasma nozzle is moved over the surface to be activated by means of a robot after the injection moulding tool has been opened. The opening stroke for the mould halves required for the robot and the plasma nozzle is currently at least 37 cm. Since this opening stroke is often not achievable for smaller machines, surface treatment in the injection moulding tool is often not considered as a process option. In addition, losses occur in the cycle time due to the longer injection moulding tool opening time, the time required for moving the robot into the injection moulding tool and for travelling over the route. In the case of the described process, it is also not possible to travel over more complex moulded part geometries, since certain processing angles cannot be set and the plasma jet cannot reach or cannot activate surfaces in undercuts.

Alternatively, it is possible for the plasma treatment to be carried out in a downstream process step. To that end, the moulded part is removed from the machine after the injection moulding cycle and the contour to be treated is travelled over outside the injection moulding tool.

In the case of the previously described methods, in each case two separate process steps result, namely, on the one hand, injection moulding the moulded part and, on the other hand, activating the surface, the process times of which add up and synergies can only be utilised to a very minor degree. However, the industry is in pursuit of ever more energy and resource efficient production methods, in order to save time and costs, reduce rejects and improve quality.

SUMMARY OF THE INVENTION

Against this background, the present invention is based on the object of providing a method and a device, by means of which a plasma pretreatment of injection moulded components is made possible in an effective manner.

With an injection moulding tool for producing an injected moulded part, in particular made of plastic, having an injection mould which has a cavity corresponding to the negative of the shape of the injection moulded part to be produced, this object is at least partly achieved by a plasma nozzle, which is configured to produce an atmospheric plasma jet, being attached to the injection mould in such a way that an injection moulded part produced in the injection mould can be impacted in the injection mould with a plasma jet.

In this way, the injection moulded part can be pretreated in the injection mould directly after the injection moulding process without any time delay being required as a result of opening of the injection mould and moving a robot into position.

By integrating the plasma nozzle into the injection moulding tool, in particular into the movable side of the injection moulding tool, plasma treatment is also made possible in the closed injection moulding tool. In this way, a considerable saving in time can be obtained and an increase in the complexity of the injection moulded parts made possible.

It was identified as a synergistic effect that in this way the residual heat of the injection moulded part can be utilised to increase the affinity of the materials or the surface tension. Furthermore, it has become apparent that pretreatment in the closed injection moulding tool requires less impact with the plasma jet, in particular a shorter impact duration, so that a further time and energy saving effect ensues.

It was further identified as a synergistic effect that the low pressure typically arising in the injection moulding tool promotes plasma diffusion and activation of the surface of the injection moulded part.

The injection mould in particular comprises at least one die and can further have one or more cores. The at least one die and the possibly provided core (or cores) form the shape of the cavity.

A core is presently understood to mean a part of the injection mould which is separate from the die and which forms at least one part of the cavity. For example, the core can define the outer contour of a groove of the injection moulded part to be produced in the cavity.

In addition, the injection mould has a sprue channel, to which the injection unit is attached in operation, in order to direct molten plastic into the cavity of the injection mould.

A plurality of plasma nozzles can also be integrated into the injection moulding tool if required.

The previously mentioned object is further at least partly achieved according to the invention by a method for producing an injection moulded part using an injection moulding tool, in particular the injection moulding tool previously described, in which the injection moulding material, in particular a plastic material, is introduced into a cavity of the injection mould, so that an injection moulded part forms, and in which the injection moulded part in the injection mould is impacted with an atmospheric plasma jet.

Various embodiments of the injection moulding tool and of the method are described below, wherein the individual embodiments are each applicable both for the injection moulding tool and for the method. The individual embodiments can also be combined with one another.

According to an embodiment, the injection mould has a movable die part, so that the injection mould is movable between a closed arrangement for the injection moulding operation and an open arrangement for the ejection operation, and the plasma nozzle is attached to the injection mould in such a way that an injection moulded part produced in the injection mould can be impacted in the die with a plasma jet while the injection mould is in the closed arrangement. In particular, the injection mould can have a first fixed die half and a second movable die half.

The plasma nozzle is attached to the injection mould in such a way that an injection moulded part produced in the injection mould can be impacted in the die with a plasma jet while the injection mould is in the closed arrangement, i.e. is closed. In this way, the injection mould does not need to be opened for the pretreatment.

According to an embodiment, an inlet opening is provided, through which a plasma jet produced by the plasma nozzle can be directed into the cavity of the injection mould.

According to a further embodiment, an outlet opening is provided, through which a gas introduced into the cavity via the inlet opening can exit the cavity.

According to an embodiment, the injection mould comprises a core which when the injection mould is in the closed arrangement is movable between a first position for the injection moulding operation and a second position for the pretreatment operation, wherein the core when moved from the first position into the second position frees a hollow space in the injection mould, into which a plasma jet produced by the plasma nozzle can be directed. In this way, by moving the core a region can be freed in a targeted way for the plasma pretreatment. According to a corresponding embodiment of the method, a core of the injection mould is moved in such a way that a hollow space is freed in the injection mould, through which the atmospheric plasma jet is directed.

In the closed arrangement of the injection mould, the core is movable between a first position and a second position. Thus, the core can be moved in the injection mould without having to open the injection mould for this purpose.

The core can in particular define the outer contour of a groove of the injection moulded part to be produced in the cavity. When moved into the second position, the core can at least partly free this groove in the injection moulded part produced beforehand, so that pretreatment of the inner surface of the groove of the injection moulded part is made possible.

According to an embodiment, the inlet opening and the outlet opening are arranged in such a way that a plasma flowing through the inlet opening to the outlet opening is guided along a region of the injection moulded part to be treated, in particular along a groove of the injection moulded part.

In particular, the inlet opening and the outlet opening can be arranged in such a way that the plasma or the plasma jet is directed through a hollow space freed by moving a core of the injection mould, in particular at a groove of the injection moulded part.

According to an embodiment, sealing means are provided which are configured to separate the plasma nozzle from the cavity during the injection moulding operation. In this way, the plasma nozzle is protected from plastic penetrating during the injection moulding operation. The sealing means can, for example, be a sealing element provided on the plasma nozzle, such as a sealing needle.

According to an embodiment, the plasma nozzle is configured to produce an atmospheric plasma jet by generating an arc discharge by applying a high-frequency high voltage between two electrodes in a working gas. According to a corresponding embodiment of the method, the atmospheric plasma jet is produced by generating an arc discharge by applying a high-frequency high voltage between two electrodes in a working gas.

A high-frequency high voltage is typically understood as a voltage of 1 to 100 kV, in particular 1 to 50 kV, preferably 10 to 50 kV, at a frequency of 1 to 350 kHz, preferably 1 to 100 kHz, particularly preferably 10 to 100 kHz, in particular 10 to 50 kHz. The high-frequency high voltage can be a high-frequency AC voltage, but can also be a pulsed DC voltage.

An atmospheric plasma jet produced in this way has a high reactivity at a relatively low temperature and enables an effective pretreatment of plastic surfaces to be carried out without damaging them.

The plasma nozzle can be operated in a pulsed manner. In particular, according to an embodiment, the arc discharge generation is pulsed. It has been shown that in this way the effectiveness of the pretreatment can be increased.

Preferably, the plasma jet is produced in a working gas, wherein preferably nitrogen or a gas mixture having a nitrogen content of at least 90% at., preferably at least 95% at., in particular at least 99% at. is used as the working gas.

In one embodiment, the plasma jet is produced in a working gas, wherein a gas having the following composition is used as the working gas: oxygen ($O_2$): 0-10% at., preferably 0-5% at., particularly preferably 0-1% at., in particular 0.1-1% at.; other gases: in total 0-10% at., preferably 0-5% at., in particular 0-1% at.; nitrogen ($N_2$): remainder. By using a working gas which essentially contains nitrogen, the reactivity of the plasma jet can be maintained at a greater distance away from the plasma nozzle. The effectiveness of the treatment can be increased by adding small amounts of oxygen.

According to an embodiment, a control device is provided which is configured to control the injection moulding tool corresponding to the previously described method or an embodiment of this method.

The control device preferably comprises a processor and a memory connected to it, in which commands are stored, the execution of which in the processor effects control of the injection moulding tool corresponding to the previously described method or an embodiment of this method.

Further features and advantages of the invention emerge from the following description of exemplary embodiments, wherein reference is made to the attached drawings.

Figure 2:
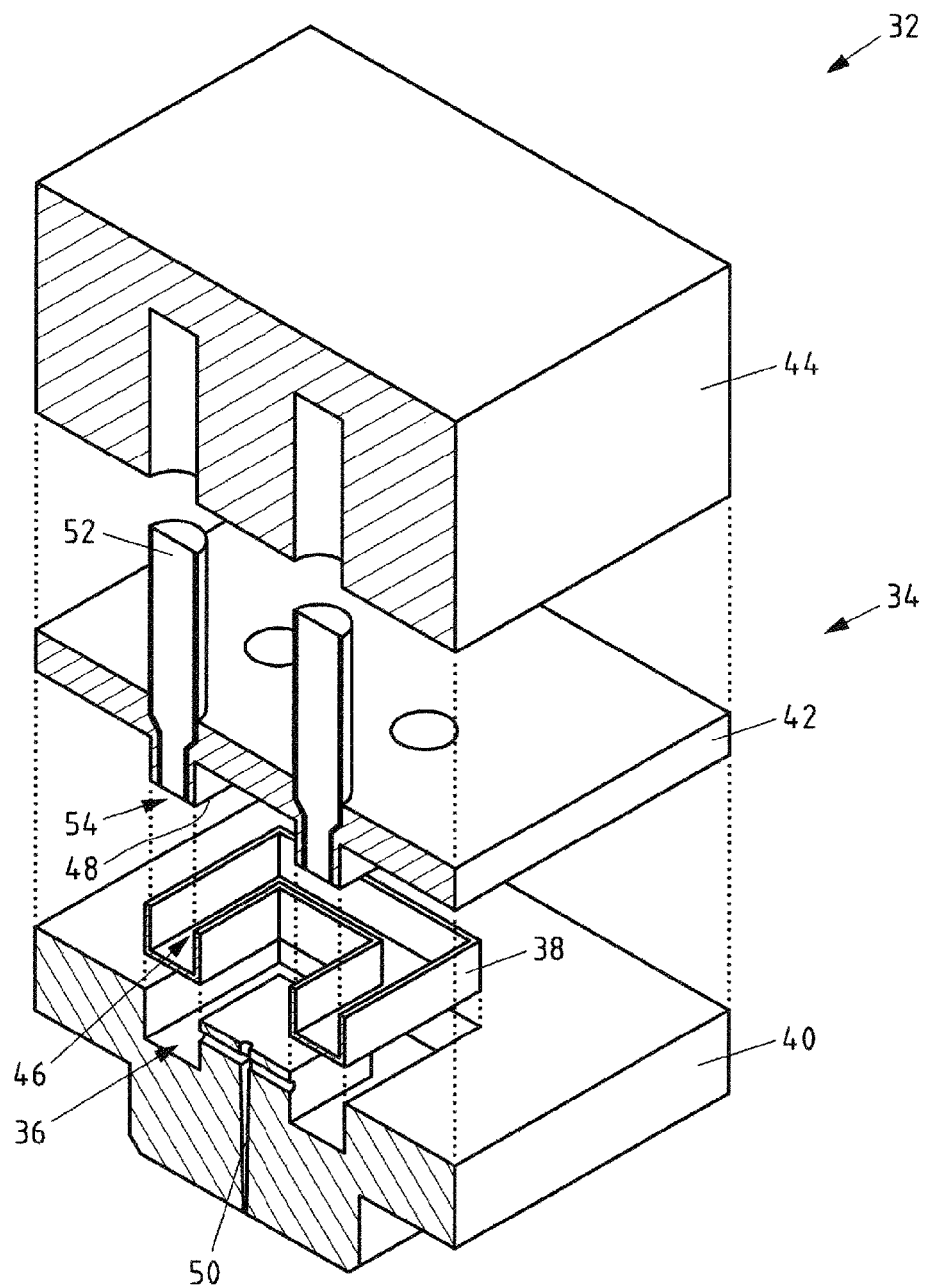
Figure 3:
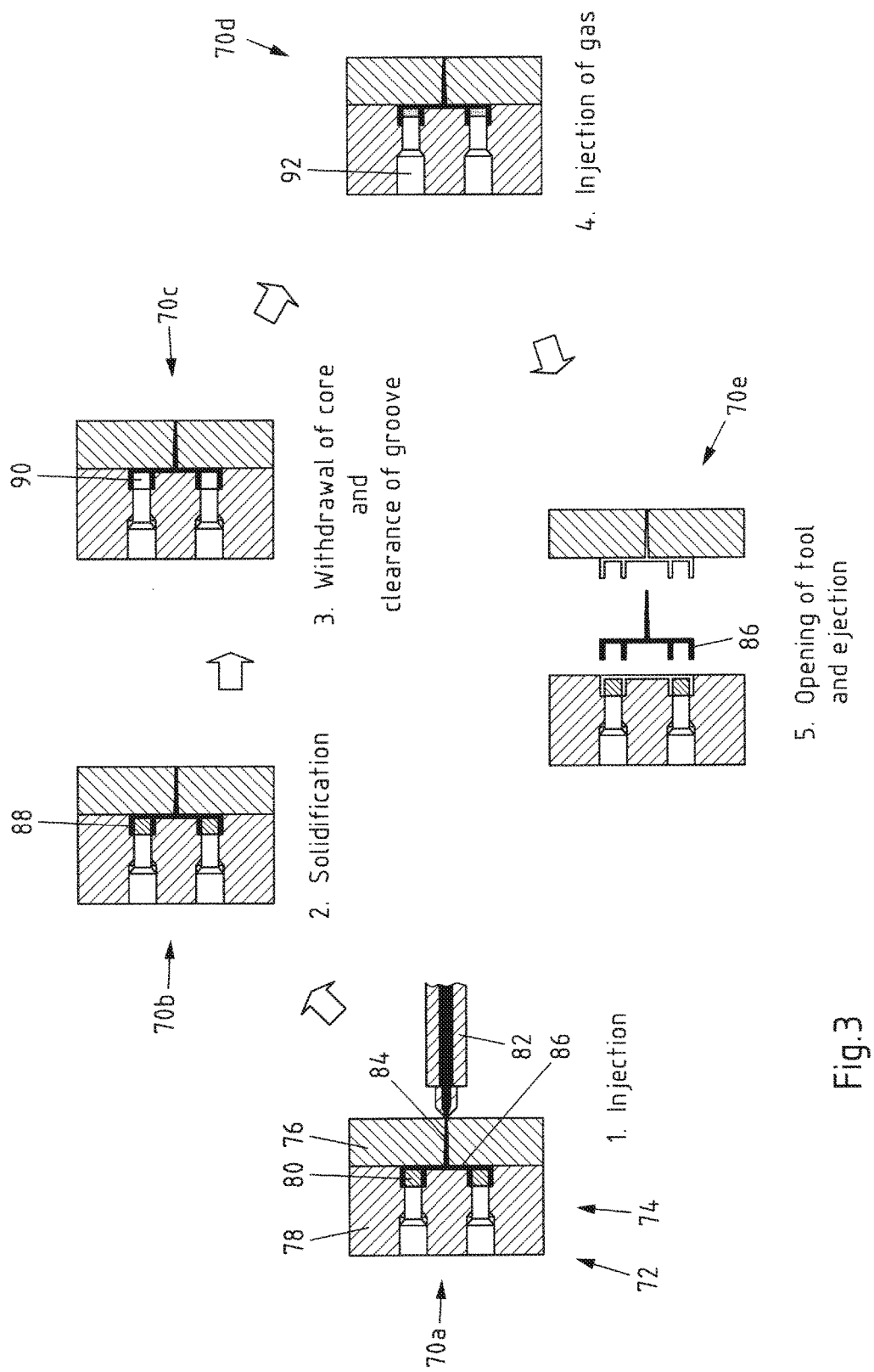
Figure 4:
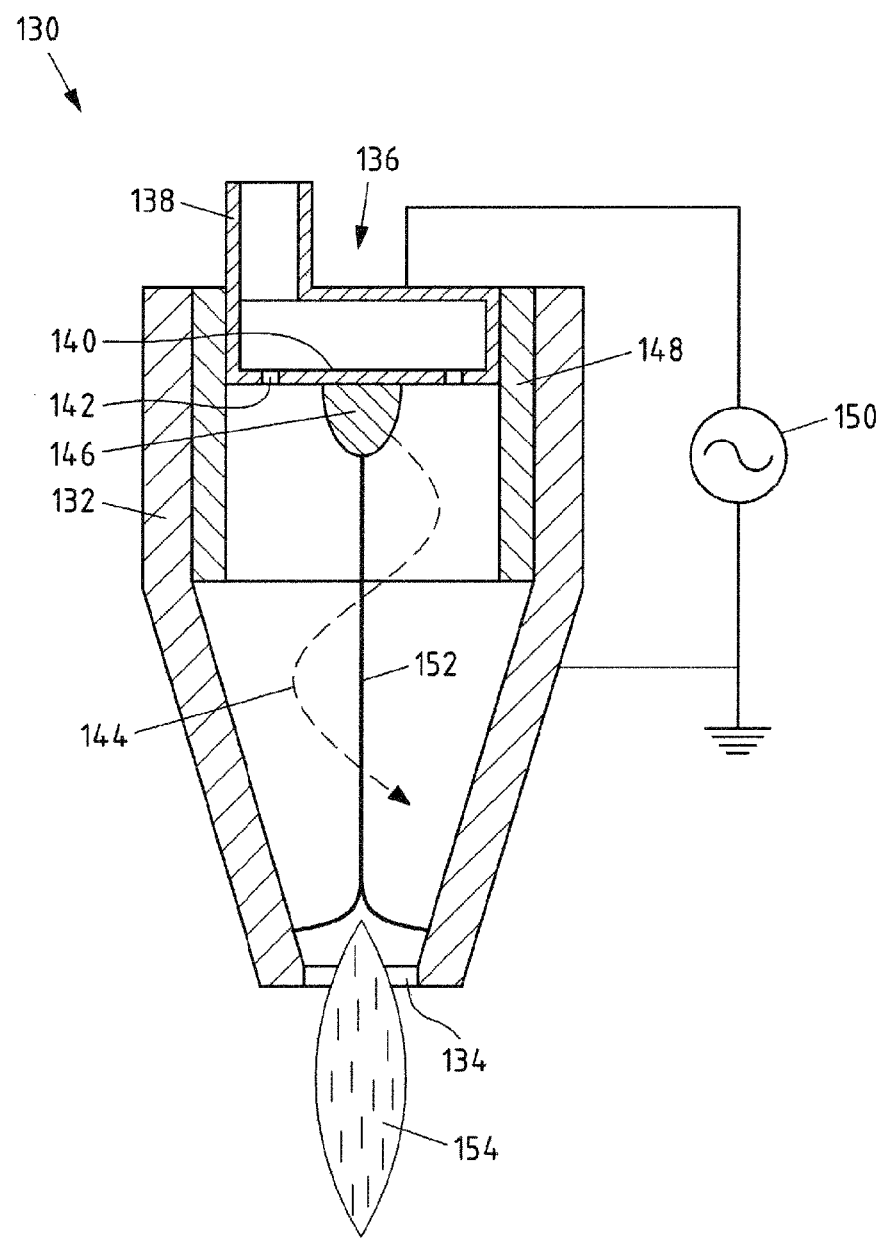

In the drawings,

FIG. 1 shows an exemplary embodiment of the injection moulding tool according to the invention, FIG. 2 shows a further exemplary embodiment of the injection moulding tool according to the invention, FIG. 3 shows an exemplary embodiment of the method according to the invention and FIG. 4 shows a plasma nozzle for producing an atmospheric plasma jet.

DETAILED DESCRIPTION

FIG. 1 shows an exemplary embodiment of the injection moulding tool according to the invention in a perspective exploded illustration.

The injection moulding tool 2 has a multi-part injection mould 4 which has a cavity 6 corresponding to the negative of the shape of the injection moulded part 8 to be produced. The injection mould 4 comprises a die half which in operation is fixed having a support 10 and an insert 12, as well as a movable die half 14 which for the injection moulding operation abuts tightly on the fixed die half (closed arrangement).

The fixed die half in operation is attached to an injection unit via a sprue channel (not illustrated), so that molten plastic can be injected from the injection unit through the sprue channel into the cavity 6. The plastic solidifying in the cavity 6 then forms the injection moulded part 8.

The movable die half 14 has a plurality of openings 16, into which a plasma nozzle 18 is inserted in each case. In this way, the injection moulded part 8 can be impacted with a plasma jet issuing from a plasma nozzle 18 when the injection moulding tool 2 is closed and can thus be pretreated. The number and arrangement of the plasma nozzles is in particular adapted to the shape of the cavity 6 or of the injection moulded part 8 formed in it.

FIG. 2 shows a further exemplary embodiment of the injection moulding tool according to the invention in a perspective exploded illustration in a sectional view.

The injection moulding tool 32 has a multi-part injection mould 34 which has a cavity 36 corresponding to the negative of the shape of the injection moulded part 38 to be produced. The injection mould 34 comprises a die half which is fixed in operation and a core 42 which is arranged on a movable die half (not illustrated). In the exemplary embodiment illustrated in FIG. 2, the core 42 completely closes off the cavity 36 to the top, so that the movable die half only acts as a support for the core 42. Alternatively, the movable die half can also at least in certain areas close off the cavity 36 to the top.

A support part 44 is arranged above the core 42 and the movable die half. For the injection moulding operation, the movable die half and the support part 44 abut tightly on the fixed die half 40 (closed arrangement).

The core 42 can be moved relative to the movable die half. In particular, the core 42 can be moved into a first position for the injection moulding operation in the direction of the fixed die half 40, so that it forms the outer contour of a groove 46 to be created in the injection moulded part 38 to be produced. A projection 48 corresponding to the inner contour of the groove 46 is provided on the underside of the core 42 for this purpose.

The movable die half is formed in such a way that the core 42, when the injection mould 34 is in the closed arrangement, can be moved between the first position and the second position, i.e. while the movable die half abuts on the fixed die half 40.

The fixed die half 40 in operation is attached to an injection unit (not illustrated) via a sprue channel 50, so that molten plastic can be injected from the injection unit through the sprue channel 50 into the cavity 36. The plastic solidifying in the cavity 36 then forms the injection moulded part 38.

After the plastic has solidified, the core 42 can be moved into a second position in the direction of the support part 44 for the pretreatment, i.e. can be withdrawn into the movable die half, so that by moving the core 42 a hollow space is formed in the region of the groove 46 of the injection moulded part. The injection mould 34 remains closed while the core 42 is moved.

A plurality of plasma nozzles 52 are integrated into the movable die half. After withdrawing the core 42 into the second position, the plasma nozzles 52 can be arranged through respective openings 54 in the core 42 in such a way that a plasma jet issuing from the plasma nozzles 52 reaches the hollow space formed in the region of the groove 46 and impacts the inner contour of the groove 46.

In this way, the injection moulded part 38 can be impacted with a plasma jet issuing from a plasma nozzle 52 when the injection moulding tool 32 is closed and can thus be pretreated. The number and arrangement of the plasma nozzles is in particular adapted to the shape of the cavity 36 or of the injection moulded part 38 formed in it.

The plasma jet or gas flow issuing from the plasma nozzles 52 is conveyed out of the injection mould again via an outlet opening (not illustrated) provided for this purpose. The plasma nozzle 52 and the outlet opening are preferably arranged in relation to one another in such a way that the plasma jet directed from the plasma nozzle 52 to the outlet opening treats the inner surface of the groove 46.

FIG. 3 shows an exemplary embodiment of the method according to the invention in a schematic illustration. FIG. 3 shows schematic cross-sections of an injection moulding tool 72 for five different method steps 70a-e of the method. The injection moulding tool 72 can, for example, be formed like the injection moulding tool 32 from FIG. 2.

In the first step 70a, the injection mould 74 of the injection moulding tool 72 is closed, i.e. the fixed die half 76 and the movable die half 78 of the injection mould 74 abut on one another. In addition, a core 80 arranged on the movable die half 78 is in a first position for the injection moulding operation. The injection mould 74 is attached to an injection unit 82, from which molten plastic at high pressure is directed through the sprue channel 84 into the cavity 86.

In the second step 70b, the molten plastic solidifies in the cavity 86 to form the injection moulded part 88.

In the third step 70c, the core 80 is withdrawn from the first position into a second position for the pretreatment, so that a hollow space 90 is freed in the region of a groove of the injection moulded part 88.

In the fourth step 70d, a plasma jet is directed into the hollow space 90 via provided plasma nozzles 92, so that the inner surface of the groove is pretreated by the plasma jet.

In the fifth step 70e, the injection mould 74 is opened and the injection moulded part 88 is ejected by means of provided ejector pins.

The first step 70a for producing the next injection moulded part can follow the fifth step 70e again, so that the described method can be easily integrated into a mass production system.

FIG. 4 shows in a schematic cross-sectional illustration a plasma nozzle for producing an atmospheric plasma jet which is suitable for use in the injection moulding tool, particularly in the injection moulding tools shown in FIGS. 1 and 2.

The plasma nozzle 130 has a nozzle tube 132 consisting of metal which essentially conically towards a nozzle tube opening 134. At the end opposite to the nozzle tube opening 134, the nozzle tube 132 has a swirling device 136 with an inlet 138 for a working gas. Preferably, nitrogen or a gas mixture having a nitrogen content of at least 90% at., preferably at least 95% at., in particular at least 99% at. is used as the working gas.

An intermediate wall 140 of the swirling device 136 has a ring of drill holes 142 placed obliquely in the circumferential direction, though which the working gas is swirled. The downstream conically tapered part of the nozzle tube 132 is therefore flowed though by the working gas in the form of a vortex 144, the core of which runs on the longitudinal axis of the nozzle tube 132.

An electrode 146 is arranged centrally on the underside of the intermediate wall 140 and protrudes into the nozzle tube 132 coaxially in the direction of the tapered section. The electrode 146 is electrically connected to the intermediate wall 140 and to the other parts of the swirling device 136. The swirling device 136 is electrically insulated from the nozzle tube 132 by a ceramic tube 148. A high-frequency high voltage, which is generated by a transformer 150, is applied to the electrode 146 via the swirling device 136. The nozzle tube 132 is earthed. A high-frequency discharge in the form of an electric arc 152 is generated between the electrode 146 and the nozzle tube 132 by the applied voltage.

The terms "electric arc" and "arc discharge" are presently used as the phenomenological description of the discharge, since the discharge occurs in the form of an electric arc. The term "electric arc" is otherwise also used as a form of discharge with DC voltage discharges with essentially constant voltage values. In this case, however, it is a high-frequency discharge in the form of an electric arc, that is to say, a high-frequency arc discharge.

Due to the swirling flow of the working gas, this electric arc 152 is channelled in the vortex core on the axis of the nozzle tube 132, so that it only branches out to the wall of the nozzle tube 132 in the area of the nozzle tube opening 134.

The working gas, which rotates at a high flow velocity in the area of the vortex core and hence in close vicinity to the electric arc 152, comes into intimate contact with the electric arc 152 and is thereby partly transformed into the plasma state, so that an atmospheric plasma jet 154 issues from the plasma nozzle 130 through the nozzle tube opening 134.

The plasma jet 154 issuing from the plasma nozzle 130 has a high reactivity at, at the same time, a relatively low temperature. Therefore, a plastic surface can be pretreated effectively with the plasma jet 154 without damaging the plastic surface as a result of this.

The invention claimed is:

1. An injection moulding tool for producing an injection moulded part, comprising:
   an injection mould which has a cavity corresponding to the negative of the shape of the injection moulded part to be produced,
   wherein the injection mould has a movable die part, so that the injection mould is movable between a closed arrangement for the injection moulding operation and an open arrangement for the ejection operation, wherein
   a plasma nozzle, which is configured to produce an atmospheric plasma jet, is attached to the injection mould in such a way that an injection moulded part produced in the injection mould can be impacted in the injection mould with a plasma jet,
   wherein the plasma nozzle is attached to the injection mould in such a way that an injection moulded part produced in the injection mould can be impacted in the injection mould with a plasma jet while the injection mould is in the closed arrangement, and
   wherein the injection mould has a core which when the injection mould is in the closed arrangement is movable between a first position for the injection moulding operation and a second position for the pretreatment operation, wherein the core when moved from the first position into the second position frees a hollow space in the injection mould, into which a plasma jet produced by the plasma nozzle can be directed.

2. The injection moulding tool according to claim 1, wherein
an inlet opening is provided, through which a plasma jet produced by the plasma nozzle can be directed into the cavity of the injection mould.

3. The injection moulding tool according to claim 1, wherein
an outlet opening is provided, through which a gas fed into the cavity via the inlet opening can exit the cavity.

4. The injection moulding tool according to claim 1, wherein
the inlet opening and the outlet opening are arranged in such a way that a plasma flowing through the inlet opening to the outlet opening is conveyed along an area of the injection moulded part to be treated, in particular along a groove of the injection moulded part.

5. The injection moulding tool according to claim 1, wherein
sealing means are provided which are configured to separate the plasma nozzle from the cavity during the injection moulding operation.

6. The injection moulding tool according to claim 1, wherein
the plasma nozzle is configured to produce an atmospheric plasma jet by generating an arc discharge by applying a high-frequency high voltage between two electrodes in a working gas.

7. The injection moulding tool according to claim 1, wherein
a control device is provided which is configured to control the injection moulding tool.

8. A method for producing an injection moulded part using an injection moulding tool according to claim 1,
wherein the injection moulding material, is introduced into a cavity of the injection mould, so that an injection moulded part forms,
wherein the injection moulded part in the injection mould is impacted with an atmospheric plasma jet, and
wherein a core of the injection mould is moved in such a way that a hollow space is freed in the injection mould, through which the atmospheric plasma jet is directed.

9. The method according to claim 8, wherein
the atmospheric plasma jet is produced by generating an arc discharge by applying a high-frequency high voltage between two electrodes in a working gas.

10. The method according to claim 9, wherein
the arc discharge generation is pulsed.

11. The method according to claim 8, wherein
a gas having the following composition is used as the working gas:
$O_2$: 0-10% at., preferably 0-5% at., in particular 0.1-1% at.;
other gases: in total 0-10% at., preferably 0-5% at., in particular 0-1% at.;
$N_2$: remainder.

* * * * *